United States Patent
Turner et al.

(10) Patent No.: US 12,163,029 B2
(45) Date of Patent: Dec. 10, 2024

(54) WAX COMPOSITIONS COMPRISING LINEAR ALPHA OLEFINS

(71) Applicant: ExxonMobil Technology and Engineering Company, Annandale, NJ (US)

(72) Inventors: Elizabeth A. C. Turner, Sarnia (CA); Leah S. Diskic, Paris (CA); Kaitlin M. Blencowe, Sarnia (CA)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 18/251,742

(22) PCT Filed: Oct. 5, 2021

(86) PCT No.: PCT/US2021/053473
§ 371 (c)(1),
(2) Date: May 4, 2023

(87) PCT Pub. No.: WO2022/098461
PCT Pub. Date: May 12, 2022

(65) Prior Publication Data
US 2024/0002667 A1    Jan. 4, 2024

Related U.S. Application Data

(60) Provisional application No. 63/110,686, filed on Nov. 6, 2020.

(51) Int. Cl.
*C08L 91/06* (2006.01)
*C11C 5/00* (2006.01)

(52) U.S. Cl.
CPC .............. *C08L 91/06* (2013.01); *C11C 5/002* (2013.01); *C11C 5/004* (2013.01); *C11C 5/008* (2013.01)

(58) Field of Classification Search
CPC ......... C11C 5/002; C11C 5/004; C11C 5/008; C08L 91/06
See application file for complete search history.

(56) References Cited

U.S. PATENT DOCUMENTS 7,527,686 B2    5/2009   Yang et al.

FOREIGN PATENT DOCUMENTS

WO    2020209952    10/2020

OTHER PUBLICATIONS

Baralt, E.J, Uses of Alpha Olefin Waxes in Candles, Alfave Conference 2003, retrieved from the internet at <https://www.alafave.org/wp-content/uploads/2015/02/Mex-2003-Chevron-Phillips-Ingles.pdf> on May 8, 2024 (Year: 2003).*

(Continued)

*Primary Examiner* — James C Goloboy
(74) *Attorney, Agent, or Firm* — C. Tumey Law Group PLLC (57) ABSTRACT

Novel wax compositions are provided herein comprising at least about 85 wt. % of linear alpha olefins having a carbon number of at least 18, about 8 wt. % to about 40 wt. % of linear alpha olefins having a carbon number of 20, and about 5 wt. % to about 30 wt. % of linear alpha olefins having a carbon number of at least 30. The present wax compositions yield smooth, one-pour container candle waxes and provide ideal container candle burn performance demonstrated by low sooting behavior and a balanced wax consumption.

15 Claims, 8 Drawing Sheets

(56) References Cited

OTHER PUBLICATIONS

International Search Report and Written Opinion for PCT/US2021/053473 dated Oct. 5, 2021.

\* cited by examiner

WAX COMPOSITIONS COMPRISING LINEAR ALPHA OLEFINS

FIELD OF THE INVENTION

The present invention relates to compositions for candles including container candles, and more particularly relates to wax compositions containing linear alpha olefin molecules of 18 carbon numbers or more which are able to yield smooth one-pour container candle wax, with little or no syneresis, enhanced color stability and fragrance retention.

BACKGROUND OF THE INVENTION

Recent trends in container candle compositions target smooth, one-pour candle waxes that have no syneresis upon pouring and minimal sooting upon burning. Although smooth candle compositions have existed, most result in tunneling at the top of the candle after the first pour. This tunneling is a common industry challenge, requiring the candle manufacturer to conduct a second pour following the initial cooling period. Candle wax compositions that allow forming a candle with one-pour represent an advantage to manufacturers and can speed up the production time.

Furthermore, a growing number of Group I refineries are closing as demand increases for Group II and Group III lubricant base stocks. As a consequence, the volume of petroleum paraffinic wax available in the marketplace is diminishing resulting in a decrease in available wax sources for candle manufacturing. To compensate for this loss in volume, candle manufacturers are utilizing alternative wax sources to meet their needs.

SUMMARY OF THE INVENTION

Provided herein are wax compositions comprising at least about 85 wt. % of linear alpha olefins having a carbon number of at least 18, about 8 wt. % to about 40 wt. % of linear alpha olefins having a carbon number of 20, and about 5 wt. % to about 30 wt. % of linear alpha olefins having a carbon number of at least 30. In an embodiment, the present wax compositions further comprise about 10 wt. % to about 27 wt. % of linear alpha olefins having a carbon number of 22; about 10 wt. % to about 17 wt. % of linear alpha olefins having a carbon number of 24; and about 10 wt. % to about 25 wt. % of linear alpha olefin having a carbon number between 26 and 30, wherein about 10 wt. % to about 40 wt. % of linear alpha olefin have a carbon number of 20.

In an embodiment, the present wax composition can comprise about 6 wt. % to about 9 wt. % of linear alpha olefins having a carbon number of 22, about 16 wt. % to about 19 wt. % of linear alpha olefins having a carbon number of 24, and about 36 wt. % to about 39 wt. % of linear alpha olefin having a carbon number between 26 and 30, and has about 26 wt. % to 29 wt. % of linear alpha olefins have a carbon number of at least 30, and about 8 wt. % to about 11 wt. % of linear alpha olefins have a carbon number of 20.

In various embodiments of the present invention, the wax compositions comprise between about 12 wt. % and about 16 wt. % of linear alpha olefins having a carbon number of 24, and the wt. % of linear alpha olefins having a carbon number of 20 is greater than or equal to the wt. % of linear alpha olefins having a carbon number of 24.

The present wax compositions can comprise about 14 wt. % to about 22 wt. % of linear alpha olefins having a carbon number of 20, about 10 wt. % to about 18 wt. % of linear alpha olefins having a carbon number of 22, about 12 wt. % to about 17 wt. % of linear alpha olefins having a carbon number of 24, about 20 wt. % to about 30 wt. % of linear alpha olefin having a carbon number between 26 and 30, and about 20 wt. % to about 35 wt. % of linear alpha olefin having a carbon number of at least 30 to provide one pour wax composition for container candles.

In embodiments of the present wax composition, the wax composition can comprise about 13 wt. % to about 20 wt. % of linear alpha olefins having a carbon number of 20, about 10 wt. % to about 15 wt. % of linear alpha olefins having a carbon number of 22, about 10 wt. % to about 15 wt. % of linear alpha olefins having a carbon number of 24, about 25 wt. % to about 34 wt. % of linear alpha olefin having a carbon number between 26 and 30, and about 23 wt. % to 30 wt. % of linear alpha olefin having a carbon number of at least 30. In an embodiment of the present wax compositions, the fraction of linear alpha olefins having a carbon number of 20 is between about 10 wt. % and 35 wt. % and the wax composition has a congealing point between about 40° C. and about 55° C.

Provided herein are methods of making a wax composition of any one of the preceding claims comprising the step of blending two or more fractions of linear alpha olefins to provide a mixture wherein the mixture is heated to a temperature sufficient to completely melt all components in the wax composition. Also provided are candles comprising the present wax composition where the container candle has a tunnel depth:container diameter ratio [mm/cm] of less than about 0.73 mm/cm, less than about 0.64 mm/cm, less than about 0.57 mm/cm and less than about 0.5 mm/cm. The wax compositions of the present invention can comprise about 5 wt. % fragrance to provide a container candle that retains color after four months and/or has a fragrance retention of at least 4 months.

Further provided herein are methods of producing a container candle using a one pour method comprising the step of blending two linear alpha olefin fractions, each fraction comprising at least 85 wt. % linear alpha olefins having a carbon number 18 or greater to produce a wax composition, and forming the wax composition into a container candle.

DETAILED DESCRIPTION OF THE DRAWINGS

DESCRIPTION OF THE PREFERRED EMBODIMENTS

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

It should also be understood that, unless clearly indicated to the contrary, in any methods claimed herein that include more than one step or act, the order of the steps or acts of the method is not necessarily limited to the order in which the steps or acts of the method are recited.

Before the present compounds, components, compositions, and/or methods are disclosed and described, it is to be understood that unless otherwise indicated this disclosure is not limited to specific compounds, components, compositions, reactants, reaction conditions, or the like, as such can vary, unless otherwise specified. It is also to be understood that the terminology used herein is for the purpose of describing particular aspects only and is not intended to be limiting.

For the purposes of this disclosure, the following definitions will apply:

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Optionally, other elements can be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The term "about" or "approximately" means an acceptable experimental error for a particular value as determined by one of ordinary skill in the art, which depends in part on how the value is measured or determined. All numerical values within the specification and the claims herein are modified by "about" or "approximately" the indicated value, and take into account experimental error and variations that would be expected by a person having ordinary skill in the art.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

It will be understood that, although the terms "first", "second", etc. can be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The term "petroleum paraffinic wax" includes waxes recovered by solvent dewaxing of hydrocarbon feedstock and include slack waxes and hydrotreated waxes. Additionally, waxy petroleum stocks include waxy distillates, raffinates, petrolatum, and microcrystalline waxes, etc. For example, petroleum paraffin wax, depending on the manufacturing, can be a dark brown, yellow, white or colorless solid derivable from petroleum, coal or oil shale by distillation. Petroleum paraffin wax is often obtained from solvent dewaxing of lubricant base stocks. The hydrocarbon feedstock to produce a refined petroleum paraffin wax include slack wax, a mixture of oil and wax. Refined waxes comprise a lower percentage of oil in the wax composition, for example, semi-refined versus fully refined. The wax can be optionally processed to remove colors and odors.

The term "congealing point" is the highest temperature at which a liquid begins to solidify. It is the maximum temperature or inflection point in a temperature-time curve. Congealing point can be determined via ASTM D938.

The term "syneresis" refers to a phenomenon where a liquid component of the wax composition separates from the solid wax composition. "Syneresis" is also referred to herein as "oil bleed" or "bleed."

The inventors recognized that there was a need for new wax compositions for candles that would increase the overall wax volume by using stranded or underutilized wax streams and, at the same time, yield a smooth one-pour container candle wax, with no syneresis, good candle burning performance, enhanced color stability and fragrance retention. The present inventors discovered new underutilized wax compositions for candles that unexpectedly yield smooth one-pour container candle wax, with no syneresis.

Provided herein are wax compositions comprising blends of linear alpha olefins having a carbon number of at least 18 or more. As described herein, certain fractions of linear alpha olefins individually were found to not demonstrate the desirable characteristics of smooth and one-pour individually. However, the present inventors discovered that a defined combination of blended fractions of linear alpha olefins unexpectedly provided superior performance attributes especially with respect to candles and, in particular, container candles.

Provided herein are wax compositions and methods for making and using the same to improve the performance characteristics of container candles. More particularly, the present wax compositions provide a smooth exterior finish, and low sooting upon burning when used in container candles.

As presented in Tables 1A and 1B immediately below and FIG. 2 and FIG. 3, a C18+ linear alpha olefin wax blend containing a C20 linear alpha olefin ("LAO") content less than 40 wt. % but greater than 10 wt. % in addition to a C30+ LAO content greater than or equal to 5 wt. % but less than 30 wt % yields a smooth, opaque container candle wax, with minimal to no syneresis and generally good burn performance (minimal sooting) as predicted by the congealing point determination.

Furthermore, when the percent of C24 is between 14 wt. % and 16 wt. % and the amount of C20 is greater than or equal to C24 (Tables 1A & 1B, FIG. 2 and FIG. 3), the container candle wax consistently demonstrates minimal to no tunneling. The reduction in tunneling is noticeable when compared to a similar melt point fully refined paraffin wax and semi-refined paraffin wax (Table 1A & 1B). This feature, known as one-pour, in the container candle manufacturing process, is an asset to candle manufacturers as it eliminates the need for either a second pour or top melt to achieve a level candle surface. As such candle manufacturers can increase production rate by eliminating a manufacturing step.

More specifically, as described in Tables 1A and 1B, the present wax compositions comprise at least about 85 wt. % of linear alpha olefins having a carbon number of at least 18, about 8 wt. % to about 40 wt. % of linear alpha olefins having a carbon number of 20, and about 5 wt. % to about 30 wt. % of linear alpha olefins having a carbon number of at least 30. In the various embodiment provided herein, the present wax compositions further comprise about 25 wt. % to about 27 wt. % of linear alpha olefins having a carbon number of 22, about 10 wt. % to about 15 wt. % of linear alpha olefins having a carbon number of 24, and about 10 wt. % to about 15 wt. % of linear alpha olefin having a carbon number between 26 and 30 and the wax composition has about 35 wt. % to about 40 wt. % of linear alpha olefin have a carbon number of 20. As also described in Tables 1A and 1B, the present wax composition can comprise about 6 wt. % to about 9 wt. % of linear alpha olefins having a carbon number of 22, about 16 wt. % to about 19 wt. % of linear alpha olefins having a carbon number of 24, and about 36 wt. % to about 39 wt. % of linear alpha olefin having a carbon number between 26 and 30, and can have about 26 wt. % to 29 wt. % of linear alpha olefins have a carbon number of at least 30, and about 8 wt. % to about 11 wt. % of linear alpha olefins have a carbon number of 20.

TABLE 1A

C18+ LAO Wax Blends: Compositional Information, Congealing Point, and Candle Aesthetic Properties

| Formula | C18 | C20 | C22 | C24 | C26-C30 | C30+ | Congealing Point [D938; ° C.] |
|---|---|---|---|---|---|---|---|
| Blend 1 | 6.5 | 47.2 | 34.9 | 11.1 | 0.1 | 0.2 | 30.2 |
| Blend 2 | 6.4 | 46.7 | 34.5 | 11.2 | 0.6 | 0.6 | 29.9 |
| Blend 3 | 5.8 | 42.1 | 31.1 | 11.8 | 4.8 | 4.3 | 31.1 |
| Blend 4 | 5.5 | 40.1 | 29.7 | 12.2 | 7.1 | 5.4 | 36.2 |
| Blend 5 | 4.9 | 35.9 | 26.9 | 13.0 | 11.8 | 8.8 | 44.0 |
| Blend 6 | 3.5 | 25.0 | 18.5 | 14.6 | 22.1 | 16.3 | 47.7 |
| Blend 7 | 3.2 | 23.6 | 17.5 | 14.9 | 23.4 | 17.4 | 48.2 |
| Blend 8 | 2.6 | 18.9 | 14.0 | 15.6 | 28.1 | 20.8 | 50.0 |
| Blend 9 | 1.9 | 14.2 | 10.6 | 16.3 | 32.8 | 24.2 | 51.9 |
| Blend 10 | 1.3 | 9.4 | 7.1 | 17.1 | 37.5 | 27.7 | 53.3 |
| Blend 11 | 0.6 | 4.8 | 3.6 | 17.8 | 42.2 | 30.8 | 54.7 |
| Blend 12 | 0.0 | 0.0 | 0.1 | 18.6 | 46.8 | 34.5 | 56.1 |
| Low melt fully refined wax | N/A | | | | | | 52.8 [D87] |
| Low melt semi refined wax | N/A | | | | | | 53.1 [D87] |

TABLE 1B

C18+ LAO Wax Blends: Results

| Formula | Aesthetic | Tunnel Depth [mm] | Tunnel Depth Diameter [mm] | Syneresis [Y/N] |
|---|---|---|---|---|
| Blend 1 | semi-translucent, mottled | 3.6 ± 0.74 | 0.52 | Y [med] |
| Blend 2 | semi-translucent, mottled | 4.7 ± 0.29 | 0.68 | Y [med] |
| Blend 3 | smooth with some mottling | 4.6 ± 0.29 | 0.67 | Y [low] |
| Blend 4 | smooth oily surface; mottled specks | 5.1 ± 0.52 | 0.73 | N |
| Blend 5 | smooth | 5.4 ± 0.69 | 0.78 | N |
| Blend 6 | smooth | 3.6 ± 1.04 | 0.52 | N |
| Blend 7 | smooth | 3.2 ± 0.76 | 0.45 | N |
| Blend 8 | smooth | 2.9 ± 0.29 | 0.42 | N |
| Blend 9 | smooth | 3.3 ± 0.27 | 0.47 | N |
| Blend 10 | smooth | 3.8 ± 1.56 | 0.55 | N |
| Blend 11 | smooth; mottled specks | 7.5 ± 2.26 | 1.08 | N |
| Blend 12 | smooth; mottled specks | 10.0 ± 1.66 | 1.43 | N |
| Low melt fully refined wax | translucent with mottled specks | 11.8 ± 0.31 | 1.69 | Y |
| Low melt semi refined wax | mottled | 6.35 ± 0.48 | 0.91 | Y |

Table 2 immediately below provides data that shows the addition of a fragrance to wax composition can affect the amount of syneresis observed and measured. Without fragrance, a fully refined paraffin wax is similar to the present wax compositions (Blend 8) with respect to the amount of syneresis observed/measured. Where the difference is found is in the addition of fragrance to the wax composition. The present wax compositions have the same amount of syneresis as the non-fragranced wax (Bend 8). On the other hand, fully refined paraffinic wax compositions and the semi-refined paraffinic wax composition both have increased syneresis when fragrance in added to the candle wax. This demonstrates that the present wax compositions have an increased ability to retain fragrance in comparison to other petroleum paraffinic waxes.

TABLE 2

Candle Aesthetic Comparison of Low Melt Petroleum Paraffinic Waxes to A LAO Wax Blend

| Wax | Tunnel Depth [mm] | Tunnel Depth: Container Diameter [mm/cm] | Syneresis [mg] | Syneresis: Total Wax Mass [mg oil/g wax] |
|---|---|---|---|---|
| Blend 8 | 2.9 | 0.42 | 0.00 | 0.0 |
| Blend 8 + 5% fragrance | 2.3 | 0.33 | 320 | 3.2 |
| Low melt fully refined wax | 11.8 | 1.69 | 110 | 1.1 |
| Low melt fully refined wax + 5% fragrance | 7.6 | 1.09 | 1180 | 11.8 |
| Low melt semi-refined wax | 6.4 | 0.92 | 10 | 0.0 |
| Low melt semi-refined wax + 5% fragrance | 11.3 | 1.62 | 10 | 0.0 |

In various embodiments of the present invention, the wax composition comprises between about 14 wt. % and about 16 wt. % of linear alpha olefins having a carbon number of 24, and the wt. % of linear alpha olefins having a carbon number of 20 is greater than or equal to the wt. % of linear alpha olefins having a carbon number of 24.

In various embodiments, the present wax compositions comprise about 24 wt. % to about 26 wt. % of linear alpha olefins having a carbon number of 20, about 17 wt. % to about 20 wt. % of linear alpha olefins having a carbon number of 22, about 14 wt. % to about 16 wt. % of linear alpha olefins having a carbon number of 24, about 21 wt. % to about 24 wt. % of linear alpha olefin having a carbon number between 26 and 30, and about 15 wt. % to about 18 wt. % of linear alpha olefin having a carbon number of at least 30 to provide one pour wax composition for container candles.

In various embodiments of the present invention, the wax composition comprises at least about 85 wt. % of linear alpha olefins having a carbon number of at least 18, about 22 wt. % to about 25 wt. % of linear alpha olefins having a carbon number of 20, about 16 wt. % to about 19 wt. % of linear alpha olefins having a carbon number of 22, about 14 wt. % to about 16 wt. % of linear alpha olefins having a carbon number of 24, about 22 wt. % to about 25 wt. % of linear alpha olefin having a carbon number between 26 and 30, and about 16 wt. % to about 19 wt. % of linear alpha olefin having a carbon number of at least 30 to provide a one pour wax composition.

In some embodiments, the wax composition comprises about 17 wt. % to about 20 wt. % of linear alpha olefins having a carbon number of 20, about 12 wt. % to about 15 wt. % of linear alpha olefins having a carbon number of 22, about 15 wt. % to about 17 wt. % of linear alpha olefins having a carbon number of 24, about 27 wt. % to about 30 wt. % of linear alpha olefin having a carbon number between 26 and 30, and about 20 wt. % to about 23 wt. % of linear alpha olefin having a carbon number of at least 30.

In various embodiments, the wax composition can comprise about 13 wt. % to about 15 wt. % of linear alpha olefins having a carbon number of 20, about 10 wt. % to about 12 wt. % of linear alpha olefins having a carbon number of 22, about 15 wt. % to about 18 wt. % of linear alpha olefins having a carbon number of 24, about 31 wt. % to about 34 wt. % of linear alpha olefin having a carbon number between 26 and 30, and about 23 wt. % to 26 wt. % of linear alpha olefin having a carbon number of at least 30.

In some embodiments, the present wax composition can comprise at least about 85 wt. % of linear alpha olefins having a carbon number of at least 18, about 10 wt. % to about 35 wt. % of linear alpha olefins having a carbon number of 20, and about 5 wt. % to about 30 wt. % of linear alpha olefins having a carbon number of at least 30 and the wax composition has a congealing point between about 40° C. and about 55° C.

In various embodiments of the present invention, the present wax compositions are useful as one-pour container candle wax comprising about 10 wt. % to about 40 wt. % of linear alpha olefins having a carbon number of 20, and about 5 wt. % to about 25 wt. % of linear alpha olefins having a carbon number of at least 30 and the wax composition has minimal to no syneresis when compared to fully refined paraffin wax and semi-refined paraffin wax.

The present wax compositions comprising linear alpha olefins have advantages over petroleum paraffin wax. The feedstock for paraffin is slack wax, which is a mixture of oil and wax, a byproduct from the refining of lubricating oil. The lower the percentage of oil in the wax the more refined it is considered (semi-refined versus fully refined paraffin wax). Petroleum paraffin wax can be processed to remove colors and odors. Paraffin wax is solid at room temperature and melts above approximately 37° C. (99° F.); its boiling point is >370° C. (698° F.). Advantages of the present wax compositions include, but are not limited to, one-pour, improved color retention over time, and improved fragrance retention over time.

In various embodiments of the present invention, the wax compositions described herein can further comprise at least one additive. Additives such as UV stabilizers can help retain color over time. In various embodiments, the additive is one or more of a UV stabilizer. In various embodiments, the additive is a UV stabilizer.

In various embodiments, in addition to a wax composition, the present compositions include one or more additives. In various embodiments, the additive or additives improve the appearance, scent, functionality and/or longevity of the wax, including when the wax is in a candle both before use, during use (in other words, when the candle is burning) and after use of the candle. In various embodiments the additive or additives are a coloring agent and/or a fragrance. In various embodiments, the compositions include less than 10 wt. % fragrance, between about 0 wt. % to about 10 wt. % fragrance, between about 0.5 and about 5 wt. % fragrance, between about 1 and about 4 wt. % fragrance, or between about 2 and about 3 wt. % fragrance, based on the total amount of the composition. In various embodiments, a coloring agent is added to the wax compositions in an amount of between about 0.005 wt. % and about 0.15 wt. %. In various other embodiments, the wax composition is partially substituted with a wax alternative, including any suitable alternative.

The present wax compositions demonstrate little or no syneresis. Syneresis of the present wax compositions (expressed in mg. oil/g of wax) is less than about 1 mg/g, less than about 0.5 mg/g, less than about 0.4 mg/g, less than about 0.3 mg/g, less than about 0.2 mg/g, less than about 0.1 mg/g, less than about 0.05 mg/g, less than about 0.02 mg/g, and less than about 0.01 mg/g.

The present wax compositions are one-pour and provide little or no tunneling (tunnel depth). The present wax compositions have a tunnel depth:container diameter ratio [mm/cm] of less than about 0.73 mm/cm, less than about 0.64 mm/cm, less than about 0.57 mm/cm, and less than about 0.5 mm/cm.

In various embodiments, the present wax compositions provide an amount of soot upon burning between about 0 and about 400 μg soot/g wax, between about 50 and about 350 μg soot/g wax, and between about 0 and about 100 μg soot/g wax.

In various embodiments, the present wax compositions provide a wax consumption upon burning between about 2.0 and about 2.6 g/hour, between about 2.1 and about 2.5 g/hr, between about 2.2 and about 2.4 g/hr, and between about 2.3 and about 2.4 g/hr.

Methods of Producing the Wax Compositions

Further provided herein are methods of making the wax compositions described herein. The methods include the steps of mixing a first blend and a second blend of linear alpha olefins to provide a mixture, and mixture the blend to a temperature of approximately 15° C. above the melting temperature of the first blend or second blend, whichever is highest to produce the present wax composition. The mixture is melted and the blends of linear alpha olefins homogenized by stirring the mixture. Optionally an additive, e.g., a coloring agent or fragrance, can combined in the wax composition at a temperature of approximately 5 to 20° C. above the melt temperature of the wax composition with continuous stirring for sufficient time to fully dissolve the coloring agent and/or fragrance in the wax composition.

In various embodiments, the methods include a step of mixing at least a first and second blend of linear alpha olefins as well as any additives (such as coloring agents and/or fragrances) and heating to a temperature sufficient to completely melt all components in the wax composition while stirring.

In various embodiments, the methods of making the wax compositions described herein include the steps of: providing at least a first and second blend of linear alpha olefins, heating the blends of linear alpha olefins to a temperature above the melting temperature of the blends of linear alpha olefins, blending the heated blends of linear alpha olefins to form a homogenous heated composition, and cooling the homogenous heated composition to room temperature to form a wax composition. The methods can further include the step of mixing one or more coloring agents, one or more fragrances or combinations thereof into the wax composition.

Articles of Manufacture

In various embodiments, the compositions described herein are used to produce various articles of manufacture including candles and more specifically, container candles. The candles comprise wax and various additives, such as additives for enhancing appearance, for example, color, and providing a pleasing scent or aroma, including when burning and/or not burning. The container candles comprise wax and additives formed into any suitable container for a container candle.

The present wax compositions provide certain quality performance improvements in comparison to candles made of other wax compositions and petroleum paraffin waxes. The present wax compositions provide smooth candle waxes which have applications in the premium container candle industry. The burning behavior is comparable with premium candle waxes.

A significant concern for candle manufactures is oil bleed. Oil bleed can be defined as the migration of oil or oil-type molecules out of and onto the surface of the solid wax. The appearance of oil on the wax candle surface is generally regarded as an unacceptable appearance phenomenon. Oil bleed is often caused by non-optimized candle production or an incompatibility of one or more additive, fragrance or solvent with the base wax. The thermal life cycle of the candle can create conditions conducive to bleed as well. Syneresis or oil bleed in candles results from a separation of liquid phase from the solid wax mass and can detract from a candle's appeal by reducing its visual appeal, handling characteristics, and fragrance throw.

Candle appearance is a quality that an end-user employs when purchasing a finished candle. As such, candles having a uniform smooth or non-smooth finish (e.g. mottled) with no oil bleed on the candle surface are preferred. Additionally, minimal sooting and reasonable wax consumption is a preferred quality.

Another important attribute for candle manufacturers is color and uniformity. The impact of wax color and appearance on the final candle formulation can be significant. For example, a translucent gray low melt fully refined wax will provide a different appearance in a given candle formulation than higher melting, more isoparaffinic wax that has a more cloudy, white-gray appearance. Candle manufacturers formulate for a given type of wax and strive to maintain a consistent color and appearance for each candle formulation. The wax composition that can exhibit a rich, creamy opaque candle whiteness is desirable. In terms of appearance, having a smooth exterior finish of the candle is preferred.

Fragrance retention is a consideration for candle manufacturers. Increased fragrance loads are often used to ensure fragrance longevity. Historically, methods for improving fragrance retention in candle manufacture include, but are not limited to the addition of high molecular weight microwax (derived from bright stock), petrolatum (petroleum jelly), other additives, and rigorous control of process conditions, such as cooling rates and sequences. The present wax compositions demonstrate improved fragrance retention over paraffin waxes. Accordingly, the present wax compositions require lesser fragrance loads than similar paraffin wax compositions to achieve the same fragrance after four months.

Oil bleed causes a greasy surface to develop in candles. In extreme cases, droplets will appear on the outer surface of the candle. Candle oil bleed negatively impacts the appearance and performance of candles. Oil bleed can cause undesired liquid transfer onto the consumer's fingers or candle package, or leave handling marks on the candle surface. In a container candle, liquid migration can leave "pockets" between the wax and the container walls. This phenomenon can also result in compromised fragrance in the finished product as fragrance migrates to the candle surface. Candle oil bleed can occur immediately or manifest itself over several weeks or months.

Different factors and conclusions can be drawn in relation to oil bleed. For example, using a higher melt point wax reduces the tendency of oil bleed. Variation in storage and transport temperatures can cause or aggravate candle oil bleed. Additives (microcrystalline wax, polyethylene, petrolatum, Vybar, and EVA) can effectively reduce candle oil bleed. However, additives function differently depending on fragrance and wax selection. Production conditions may be optimized for each wax-fragrance system.

Additional features of the invention are described in the following non-limiting examples.

Example I

Smooth, One-Pour Wax Compositions

Figure 1:
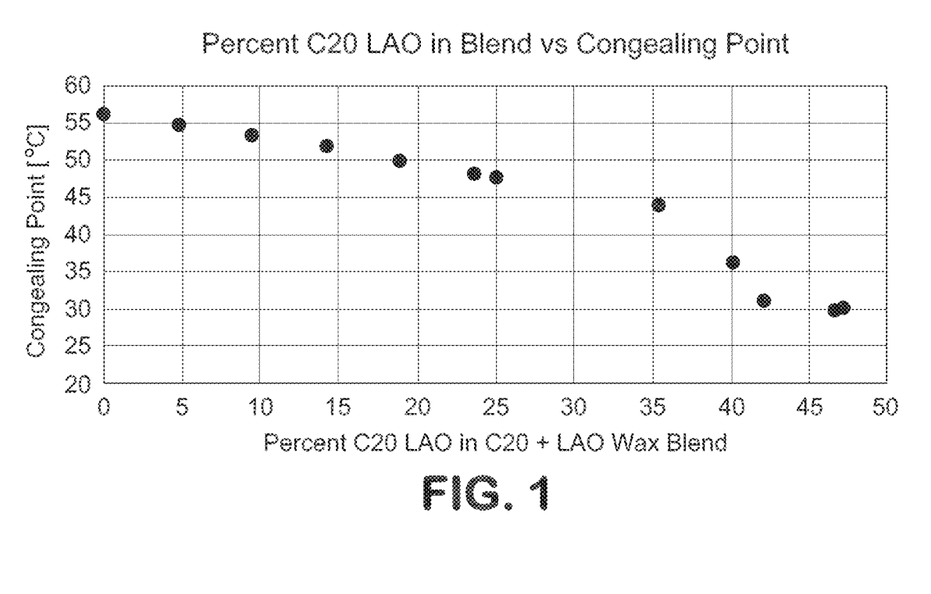
FIG. 1 is a graph depicting the relationship between congealing point (ASTM D938) and percent C20 linear alpha olefin ("LAO") in a C18+ LAO wax blend.

As shown in FIG. 1, the observed congealing point of a C18+ LAO wax comprising various LAO fractions were determined based on the overall C20 LAO concentration within the wax blend. Congealing point can be meaningfully influenced when the concentration of C20 LAO in the C18+ LAO wax blend is less than or equal to 42 wt. %. When the concentration of C20 LAO in the C18+ LAO wax blend is less than or equal to 35 wt. % the relationship between C20 LAO and congealing point becomes generally linear. This compositional relationship can be helpful in designing LAO wax blends (wax compositions) targeted at specific solid-liquid transition points.

Figure 2:
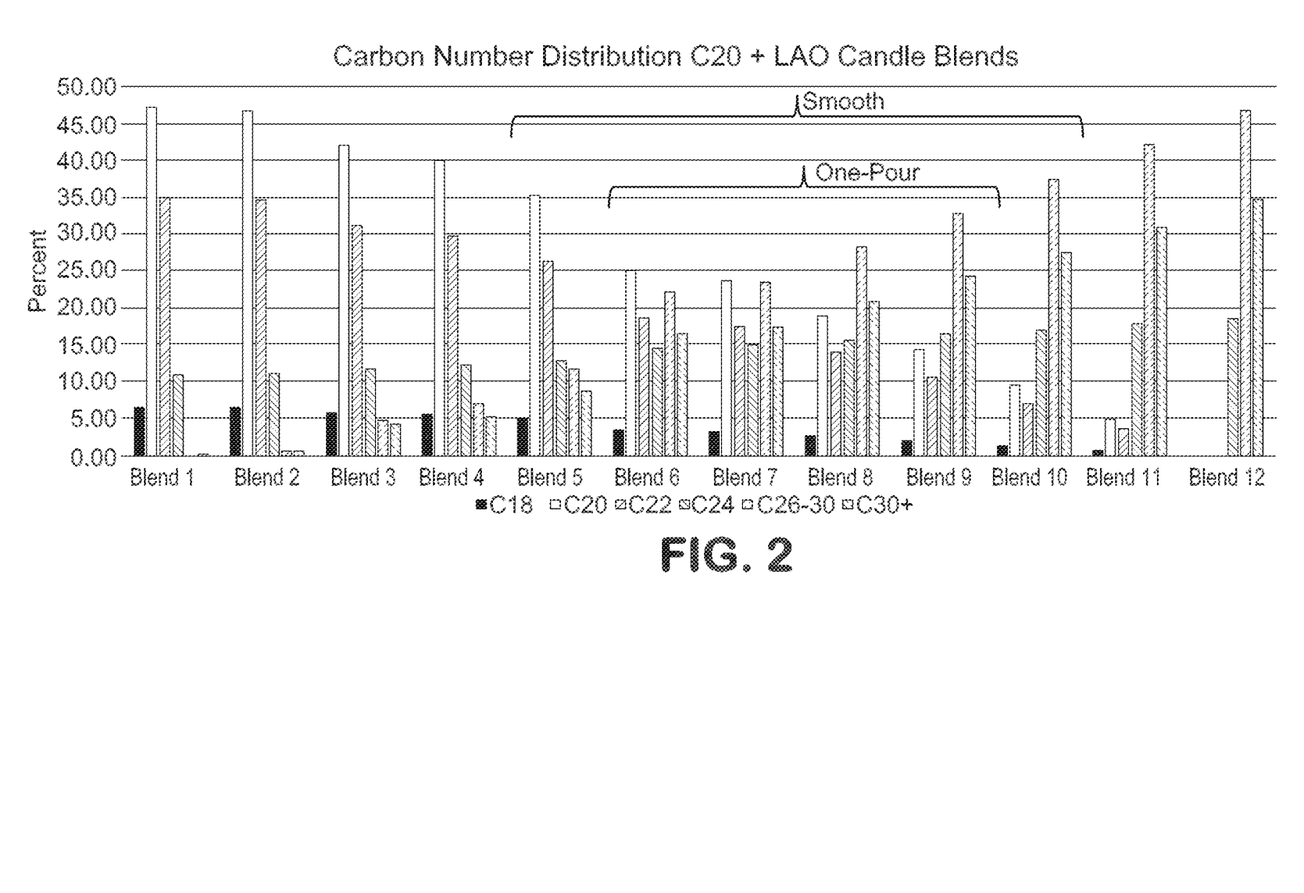
FIG. 2 is a chart showing the detailed compositional information for various C18+ LAO wax blends and the resulting range required to achieve the desired candle aesthetics of both smooth and one-pour.
Figure 3:
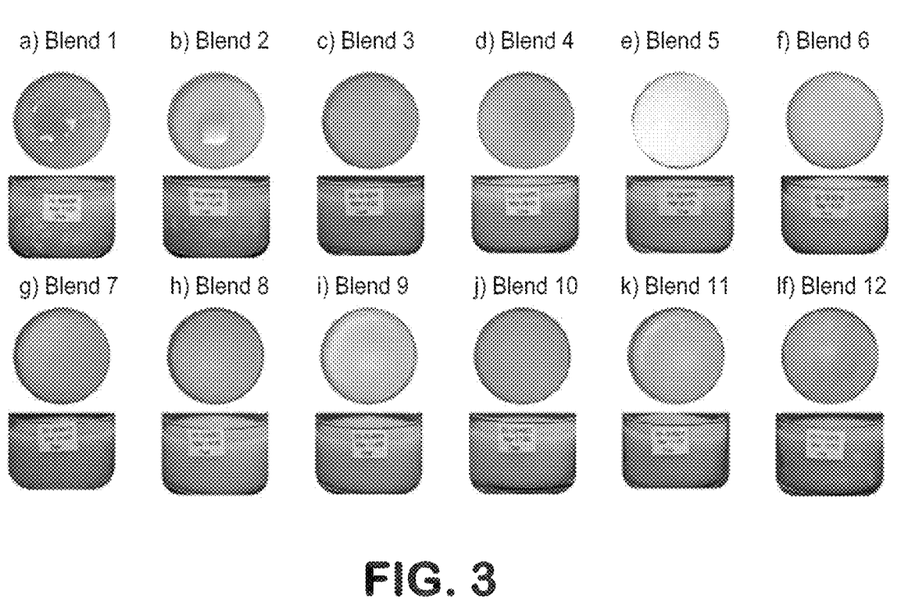
FIG. 3A, 3B, 3C, 3D, 3E, 3F, 3G, 3H, 3I, 3J, 3K and 3L are each a picture of a candle aesthetic achieved with varying the compositions of C18+ LAO molecules of Blends 1 through 12 as described in Table 1 herein.

As shown in Table 1, FIG. 2 and FIG. 3, wax compositions having a C20 LAO content less than 40 wt. % but greater than 10 wt. %, in addition to a C30+ LAO content greater than or equal to 5 wt. % but less than 30 wt. %, yields a smooth, opaque container candle waxes predicted by the congealing point determination. Such wax compositions are smooth, opaque container candle wax, with minimal to no syneresis and generally good burn performance (minimal sooting) as predicted by congealing point determination.

Furthermore, when the percent of C24 is between about 14 to about 16 wt. % and the amount of C20 is greater than or equal to C24 (Table 1, FIG. 2 and FIG. 3), the candle wax (wax composition) consistently demonstrates minimal to no tunneling. The reduction in tunneling is noticeable when compared to a similar melt point fully refined paraffin wax and semi-refined paraffin wax (Table 1). This feature is known as one-pour in the candle manufacturing process and is an asset to candle manufacturers as it eliminates the need for either a second pour or top melt to achieve a level candle surface. As such candle manufacturers can increase production rate by eliminating a manufacturing step.

Example II

Candle Aesthetics with Present Wax Compositions

Supporting the unique compositional advantage of the present wax compositions, FIG. 3 demonstrates the disadvantages of a container candle wax achieved outside of the prescribed C20 LAO and C30+ LAO bounds. When C30+ LAO is less than 5 wt. % the candle wax was found to be semi-translucent with sporadic mottling (FIG. 3A) and demonstrated significant syneresis after 24 hours which increased after 5 days.

Figure 8:
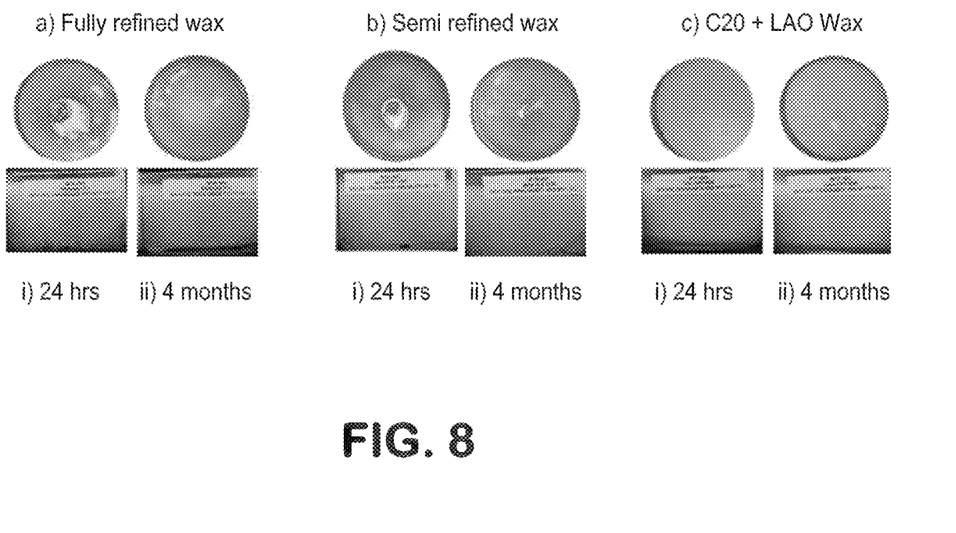
FIG. 8A, FIG. 8B and FIG. 8C are pictures comparing container candles found to retain color over time for container candles comprising a fully refined wax, a semi-refined wax and the present wax composition of C20+ linear alpha olefin.

Furthermore, the present wax compositions also demonstrate enhanced candle performance properties when compared to traditional paraffinic waxes. In the absence of any UV stabilizer additives, paraffinic candles prepared with 5 wt. % fragrance, 2 wt. % mineral oil and candle dye were found to fade in color over time (greater than 4 months). This is not unexpected in the industry and as such, candle manufacturers utilize additives, such as UV stabilizers to ensure color retention over time. What was unexpected was that a candle prepared in the same manner, with the same fragrance, and dye but that utilized the unique C18+ linear alpha olefin candle wax described in this invention was found to retain color over time. See, FIG. 8.

Fragrance retention is also a critical concern for candle manufactures, often leading to increased fragrance loads to ensure fragrance longevity. A side-by-side fragrance retention comparison of a container candle prepared using the unique C18+ linear alpha olefin candle wax (one of the present wax compositions) and paraffinic container candle waxes found the fragrance in the linear alpha olefin candle to be more pronounced after 4 months, as determined by an olfactory test.

Example III

Burn Performance of Present Wax Compositions

Figure 4:
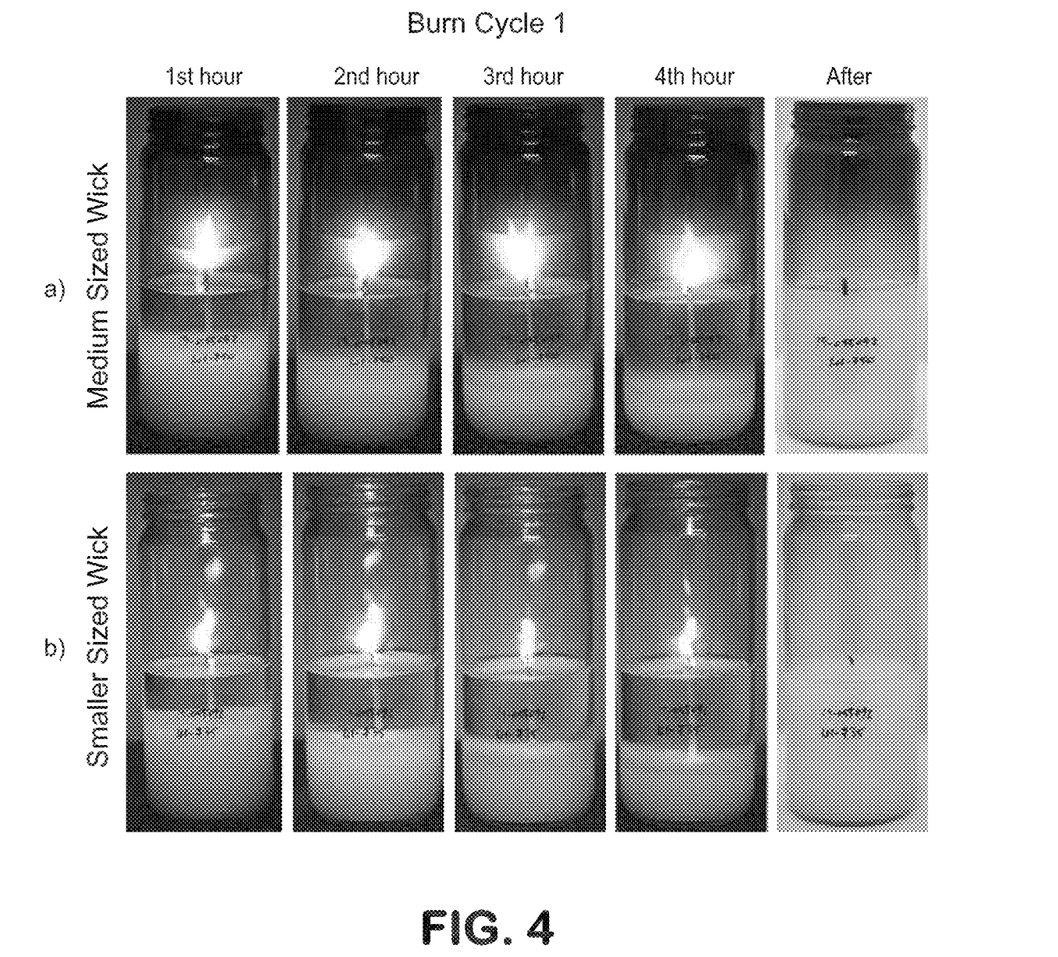
FIG. 4A and FIG. 4B are photos of a container candle comprised of a wax composition of Blend 1 described in Table 1 and having a medium wick size (FIG. 4A) or a smaller wick size (FIG. 4B) over a burn cycle in increments of 1 hour and after the burn cycle.

As shown in FIG. 4A and FIG. 4B, a low congealing point (30° C.) is problematic when burning in a container candle of 2-3" in diameter. Using a medium sized (1.5 mm×2 mm) premium flat braided cotton core wick (FIG. 4a), the candle wax burns too quickly (5.3 g wax/hr), creating a nearly fully liquid melt pool and producing a significant amount of soot; both on the jar and on the filter paper assembly above the burning candle (710 µg soot/g wax). Reducing the size of the wick (1.6 mm×1.7 mm; FIG. 4B) reduces the accumulation of soot and only marginally improves the melt pool development.

Figure 5:
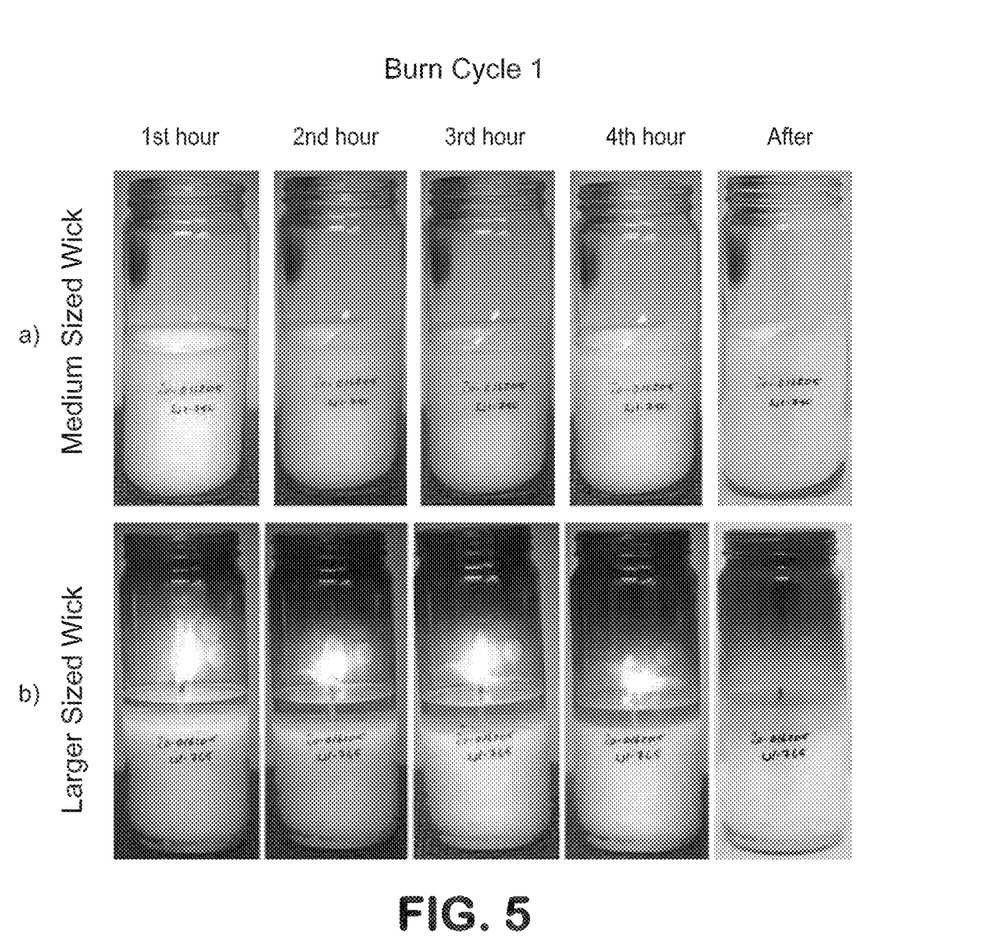
FIG. 5A and FIG. 5B are photos of a container candle comprised of a wax composition of Blend 12 as described in Table 1 having a medium wick size (FIG. 5A) and a smaller wick size (FIG. 5B) over a burn cycle in increments of 1 hour and after the burn cycle.

Additionally, FIG. 3L and FIG. 5 demonstrate the disadvantage of utilizing the LAO wax having less than 10 wt. % C20 LAO within the composition. Although the candle generally achieves the desired smooth aesthetic (with some sporadic, non-uniform mottling) and no syneresis, significant contraction (10 mm) results upon cooling, leading to a pronounced tunnel at the top of the candle. Additionally, the higher congealing point (56° C.) results in a poorer-burning container candle wax (FIG. 5). With a medium diameter (1.5 mm×2 mm mm) premium flat braided cotton core wick (FIG. 5A), the candle wax is unable to achieve a melt pool resulting in the tunneling of the wax during the course of the 4 hour burn cycle. Increasing the size of the wick (1.75 mm×2 mm) enables better development of the melt pool however this comes at a cost of increased soot production, both on the glass container and isolated in the filter assembly above the burning candle (280 µg soot/g wax).

Figure 6:
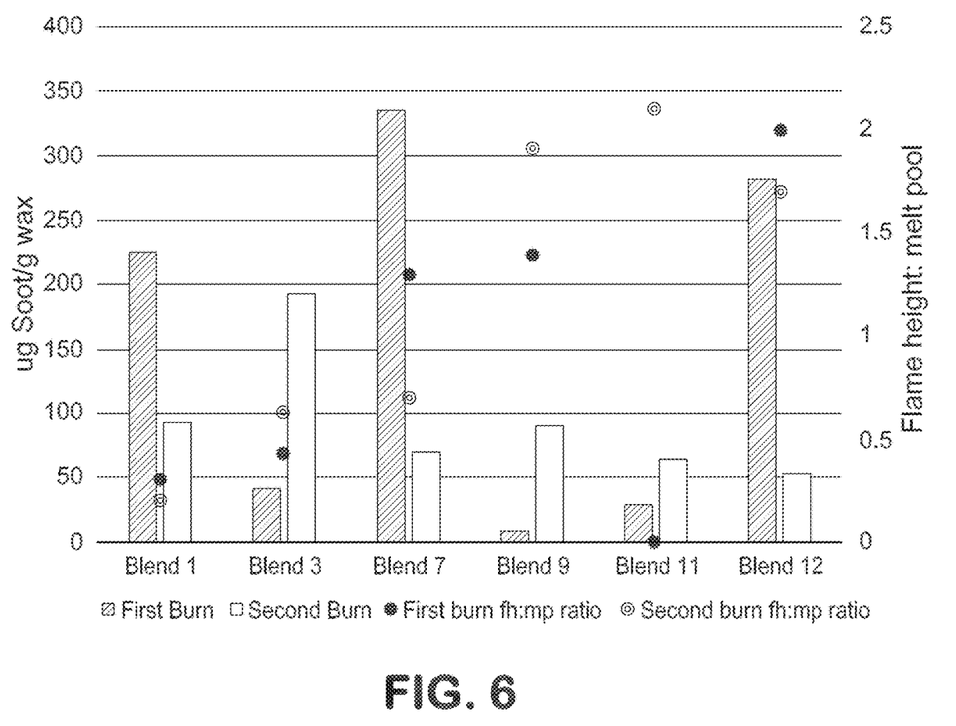
FIG. 6 is a chart showing the relationship between wax compositions of Table 1 and soot accumulation of two 4-hour candle burn cycles (shown in bars) and average flame height to melt pool ratios (shown in dots).
Figure 7:
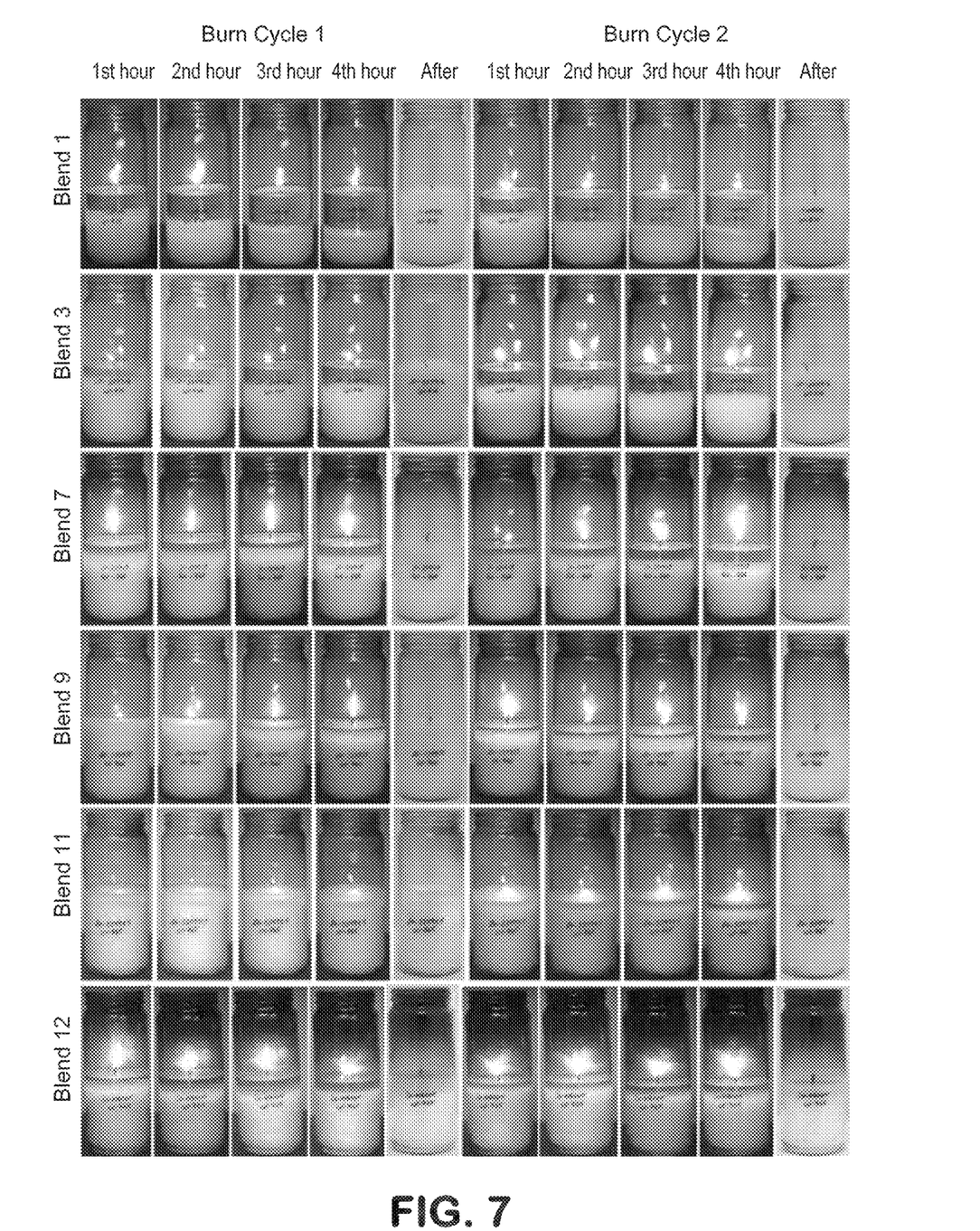
FIG. 7 shows melt pool development as shown in pictures of different container candles made of Blend 1, Blend 3, Blend 7, Blend 9, Blend 11 and Blend 12 described in Table 1 over two burn cycles, Burn Cycle 1 and Burn Cycle 2 and over one hour increments of time and after the burn cycle.

FIG. 6 and FIG. 7 also demonstrate that the unique combinations of the present wax compositions (C18+ LAO wax blends) that yield smooth one-pour container candle waxes are also the compositions that have ideal container candle burn performance, as demonstrated by low sooting behavior and a balanced melt pool depth to flame height ratio.

Finally, FIG. 6 shows the relationship between composition (reference to Table 1 for blend compositional information (compositional information of the present wax composition)) and soot accumulation during two 4-hour candle burn cycles [bars] and average flame height to melt pool ratio shown by dots.

Tunnel Method Test

The tunnel depth is determined herein using a 5 oz. candle jar with an inside diameter of 2.75" (6.985 cm) and filled with 100 g of wax. After the wax has fully solidified in the container, a crossbar is placed at the approximate center of the top surface and spanning the wax from side to side. The depth is measured using a micrometer to obtain the total depth. The thickness of the crossbar is then subtracted from the total depth to obtain the depth of the wax tunneling. This value is reported in millimeters. As the magnitude of tunneling can be influenced by the diameter of the candle jar, a ratio of tunnel depth to inside diameter of the candle container is further reported (expressed as mm/cm).

Syneresis Method Test

The syneresis method test used herein is based the method described in the IGI paper, The International Group, Inc., *Syneresis (Bleed) in Candles A Petroleum Wax Perspective*, September 2001. The method used herein is based on an absorption method for measuring syneresis, but using a different absorbent and only measuring the amount present on the top surface of the candle at twenty-four (24) hours after pouring. The value reported herein is recorded in milligrams. However since the amount of syneresis is dependent on the quantity of wax used, syneresis is represented as a ratio. The ratio is expressed as the amount of syneresis (oil) observed (in milligrams) relative to the amount of wax used in the candle (also represented as grams); thus reported as mg oil/g wax.

Candle Burn Test

As described herein, candle burn is tested using two burn cycles lasting four hours each and completed on separate days. The candles were prepared in tall religious candle type jars using premium cotton wicks. The jars are filled approximately half-full to promote incomplete combustion as to evaluate a worst case scenario. Candles are burned in a chamber that is both under vacuum and air. The chamber is also equipped with a filter assembly located at the top of the chamber. Each hour the filter paper is removed and a new filter paper is placed in the filter assembly. This allows for the color and quantity of the soot to be determined throughout each hour of the burn cycle. Additionally during each burn cycle, the candle is observed on an hourly basis to obtain both qualitative and quantitative data. The data includes flame height/stability, sooting (visual and quantity), deposit color, and any other notable observations. At the end of the burn cycle, wax pool depth is measured and any soot deposit on the chamber wall is noted. After the candle has cooled, any tunneling and wax hang up are noted if present. Candle weight is taken both before and after each burn cycle to monitor wax consumption (reported as g/hr).

There is no industry standard to determine the effectiveness of a candle burn. Methods do exist like EN15426 (specifically section 8 on burning) and RAL GZ-41/1 (particularly section 1; related to container candles) but are not absolutely required by candle manufacturers in order to market a candle. The method described herein uses some of the methodology of certain standard methods, namely the requirement of 4 hour burn cycles for container candles while improving on the ability to measure soot.

Dye Use in Candles

Both solid and liquid candles dyes can be used where the diluent is either a solid paraffin or oil/liquid paraffin respectively. The amount of dye depends on the color to be achieved. Roughly for pale colors 0.005% is required. Medium shades 0.05%, dark shade 0.1% and black 0.15%. These are rough estimates and could vary slightly depending on the candle manufacturer's needs.

Retention of color is important to the quality of the candle. Consumers expect the color to be retained over a long period of time and do not expect a candle color to fade. For this reason a UV stabilize is used. Given there appears to be some inherent color stability with the present invention this means a candle manufactured could potentially use less UV stabilizer with said wax; thus reducing the manufacturing cost of the candle.

ADDITIONAL EMBODIMENTS

Embodiment 1. A wax composition comprising: at least about 85 wt. % of linear alpha olefins having a carbon number of at least 18; about 8 wt. % to about 40 wt. % of linear alpha olefins having a carbon number of 20; and about 5 wt. % to about 30 wt. % of linear alpha olefins having a carbon number of at least 30.

Embodiment 2. The wax composition of Embodiment 1, further comprising: about 10 wt. % to about 27 wt. % of linear alpha olefins having a carbon number of 22; about 10 wt. % to about 17 wt. % of linear alpha olefins having a carbon number of 24; and about 25 wt. % to about 10 wt. % of linear alpha olefin having a carbon number between 26 and 30, wherein about 35 wt. % to about 40 wt. % of linear alpha olefin have a carbon number of 20.

Embodiment 3. The wax composition of Embodiment 1, further comprising: about 6 wt. % to about 9 wt. % of linear alpha olefins having a carbon number of 22; about 16 wt. % to about 19 wt. % of linear alpha olefins having a carbon number of 24; and about 36 wt. % to about 39 wt. % of linear alpha olefin having a carbon number between 26 and 30, wherein about 26 wt. % to 29 wt. % of linear alpha olefins have a carbon number of at least 30, and about 8 wt. % to about 11 wt. % of linear alpha olefins have a carbon number of 20.

Embodiment 4. The wax composition of Embodiment 1, further comprising between about 12 wt. % and about 16 wt. % of linear alpha olefins having a carbon number of 24, and the wt. % of linear alpha olefins having a carbon number of 20 is greater than or equal to the wt. % of linear alpha olefins having a carbon number of 24.

Embodiment 5. A wax composition of Embodiment 1, wherein about 14 wt. % to about 25 wt. % of linear alpha olefins having a carbon number of 20, about 10 wt. % to about 18 wt. % of linear alpha olefins having a carbon number of 22, about 12 wt. % to about 17 wt. % of linear alpha olefins having a carbon number of 24, about 20 wt. % to about 30 wt. % of linear alpha olefin having a carbon number between 26 and 30, and about 20 wt. % to about 25 wt. % of linear alpha olefin having a carbon number of at least 30.

Embodiment 6. A wax composition of Embodiment 1, wherein about 13 wt. % to about 20 wt. % of linear alpha olefins having a carbon number of 20, about 10 wt. % to about 15 wt. % of linear alpha olefins having a carbon number of 22, about 10 wt. % to about 15 wt. % of linear alpha olefins having a carbon number of 24, about 25 wt. % to about 34 wt. % of linear alpha olefin having a carbon number between 26 and 30, and about 23 wt. % to 30 wt. % of linear alpha olefin having a carbon number of at least 30.

Embodiment 7. A wax composition of Embodiment 1, wherein the fraction of linear alpha olefins having a carbon number of 20 is between about 10 wt. % and 35 wt. % and the wax composition has a congealing point between about 40° C. and about 55° C. per ASTM D938.

Embodiment 8. A method of making a wax composition comprising the step of blending two or more fractions of linear alpha olefins to provide a mixture wherein the mixture is heated to a temperature sufficient to completely melt all components in the wax composition.

Embodiment 9. A candle comprising the wax composition wherein the container candle having a tunnel depth:container diameter [mm:cm] between about 0.37 and about 1.72.

Embodiment 10. A wax composition, wherein the container candle has a fragrance retention of at least 4 months as determined by an olfactory test.

Embodiment 11. A method of producing a candle using a one pour method comprising the step of blending two linear alpha olefin fractions, each fraction comprising at least 85 wt. % linear alpha olefins having a carbon number 18 or greater to produce a wax composition, and forming the wax composition into a container candle.

Embodiment 12. A container candle comprising a wax composition having at about 85 wt. % of linear alpha olefins having a carbon number of at least 18; about 8 wt. % to about 40 wt. % of linear alpha olefins having a carbon number of 20; and about 5 wt. % to about 30 wt. % of linear alpha olefins having a carbon number of at least 30.

Embodiment 13. The container candle of Embodiment 12 having a tunnel depth:container diameter ratio [mm/cm] of less than about 0.73 mm/cm.

Embodiment 14. The container candle of Embodiment 12 wherein the tunnel depth:container diameter ratio [mm/cm] is less than about 0.64 mm/cm.

Embodiment 15. The container candle of Embodiment 12 wherein the tunnel depth:container diameter ratio [mm/cm] is less than about 0.57 mm/cm.

Embodiment 16. The container candle of Embodiment 12 wherein the tunnel depth:container diameter ratio [mm/cm] is less than about 0.5 mm/cm.

Embodiment 17. The container candle of Embodiment 12, further comprising about 5 wt. % fragrance.

Embodiment 18. The container candle of Embodiment 12, wherein the container candle retains color after four months.

Embodiment 19. The container candle of Embodiment 12, wherein the container candle has a fragrance retention of at least 4 months.

All numerical values within the detailed description and the claims can modified by "about" or "approximately" the indicated value, taking into account experimental error and variations.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited.

Additionally, within a range includes every point or individual value between its end points even though not explicitly recited. Thus, every point or individual value can serve as its own lower or upper limit combined with any other point or individual value or any other lower or upper limit, to recite a range not explicitly recited.

What is claimed is:

1. A wax composition comprising: at least about 85 wt. % of linear alpha olefins having a carbon number of at least 18; about 8 wt. % to about 40 wt. % of linear alpha olefins having a carbon number of 20; and about 5 wt. % to about 30 wt. % of linear alpha olefins having a carbon number of at least 30.

2. The wax composition of claim 1, further comprising: about 10 wt. % to about 27 wt. % of linear alpha olefins having a carbon number of 22; about 10 wt. % to about 17 wt. % of linear alpha olefins having a carbon number of 24; and about 25 wt. % to about 10 wt. % of linear alpha olefin having a carbon number between 26 and 30, wherein about 35 wt. % to about 40 wt. % of linear alpha olefin have a carbon number of 20.

3. The wax composition of claim 1, further comprising: about 6 wt. % to about 9 wt. % of linear alpha olefins having a carbon number of 22; about 16 wt. % to about 19 wt. % of linear alpha olefins having a carbon number of 24; and about 36 wt. % to about 39 wt. % of linear alpha olefin having a carbon number between 26 and 30, wherein about 26 wt. % to 29 wt. % of linear alpha olefins have a carbon number of at least 30, and about 8 wt. % to about 11 wt. % of linear alpha olefins have a carbon number of 20.

4. The wax composition of claim 1, further comprising between about 12 wt. % and about 16 wt. % of linear alpha olefins having a carbon number of 24, and the wt. % of linear alpha olefins having a carbon number of 20 is greater than or equal to the wt. % of linear alpha olefins having a carbon number of 24.

5. A wax composition of claim 1, wherein about 14 wt. % to about 25 wt. % of linear alpha olefins having a carbon number of 20, about 10 wt. % to about 18 wt. % of linear alpha olefins having a carbon number of 22, about 12 wt. % to about 17 wt. % of linear alpha olefins having a carbon number of 24, about 20 wt. % to about 30 wt. % of linear alpha olefin having a carbon number between 26 and 30, and about 20 wt. % to about 25 wt. % of linear alpha olefin having a carbon number of at least 30.

6. A wax composition of claim 1, wherein about 13 wt. % to about 20 wt. % of linear alpha olefins having a carbon number of 20, about 10 wt. % to about 15 wt. % of linear alpha olefins having a carbon number of 22, about 10 wt. % to about 15 wt. % of linear alpha olefins having a carbon number of 24, about 25 wt. % to about 34 wt. % of linear alpha olefin having a carbon number between 26 and 30, and about 23 wt. % to 30 wt. % of linear alpha olefin having a carbon number of at least 30.

7. A wax composition of claim 1, wherein the fraction of linear alpha olefins having a carbon number of 20 is between about 10 wt. % and 35 wt. % and the wax composition has a congealing point between about 40° C. and about 55° C. per ASTM D938.

8. A method of producing a candle using a one pour method comprising the step of introducing a wax composition comprising at least about 85 wt. % linear alpha olefins having a carbon number of at least 18, about 8 wt. % to about 40 wt. % of linear alpha olefins having a carbon number of 20, and about 5 wt. % to about 30 wt. % of linear alpha olefins having a carbon number of at least 30 into a container, and forming the wax composition into a container candle.

9. A container candle comprising a wax composition having at about 85 wt. % of linear alpha olefins having a carbon number of at least 18; about 8 wt. % to about 40 wt. % of linear alpha olefins having a carbon number of 20; and about 5 wt. % to about 30 wt. % of linear alpha olefins having a carbon number of at least 30.

10. The container candle of claim 9 having a tunnel depth:container diameter ratio [mm/cm] of less than about 0.73 mm/cm.

11. The container candle of claim 9 wherein the tunnel depth:container diameter ratio [mm/cm] is less than about 0.64 mm/cm.

12. The container candle of claim 9 wherein the tunnel depth:container diameter ratio [mm/cm] is less than about 0.57 mm/cm.

13. The container candle of claim 9 wherein the tunnel depth:container diameter ratio [mm/cm] is less than about 0.5 mm/cm.

14. The container candle of claim 9, further comprising about 5 wt. % fragrance.

15. The container candle of claim 9 having a tunnel depth:container diameter [mm:cm] between about 0.37 and about 1.72.

* * * * *